June 30, 1925.
G. A. CARLSTEDT
1,544,432
EGG GRADING SCALE
Filed Feb. 2, 1924
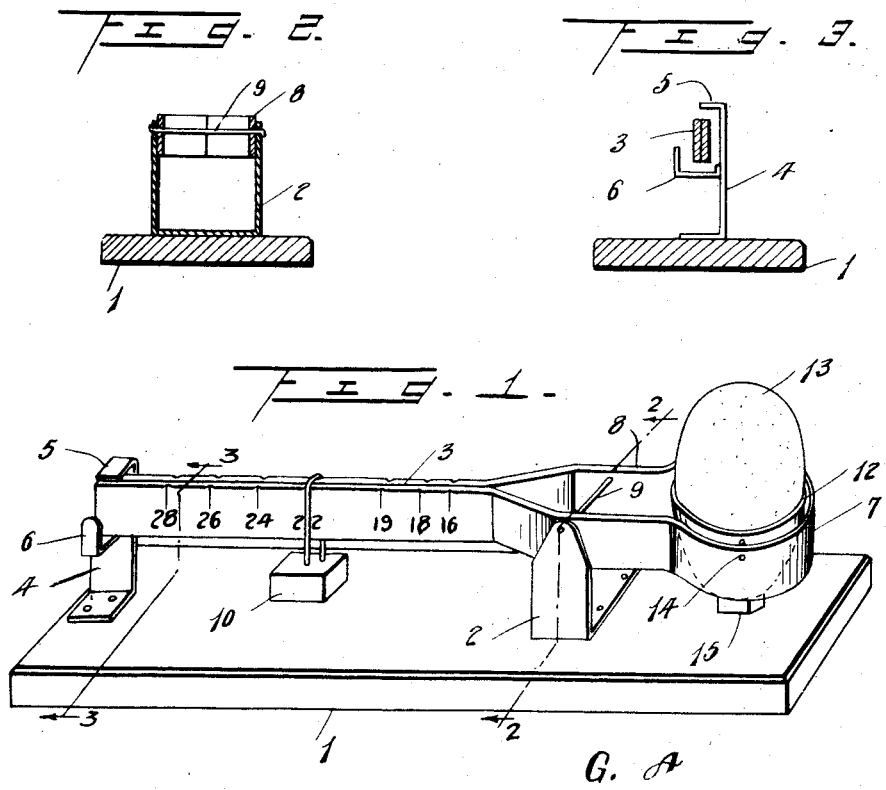
Inventor
G. A. Carlstedt.
By
Attorney Patented June 30, 1925.

1,544,432

UNITED STATES PATENT OFFICE.

GUSTAV A. CARLSTEDT, OF EDMONDS, WASHINGTON.

EGG-GRADING SCALE.

Application filed February 2, 1924. Serial No. 690,257.

*To all whom it may concern:*

Be it known that I, GUSTAV A. CARLSTEDT, a citizen of the United States, residing at Edmonds, in the county of Snohomish and State of Washington, have invented certain new and useful Improvements in Egg-Grading Scales; and I do hereby declare the following to be a full, clear, and exact description of the invention, such as will enable others skilled in the art to which it appertains to make and use the same.

The object of the present invention is the provision of a balance whereby eggs may be graded as to weight so that a dozen eggs may aggregate a given number of ounces, with the result that the producer may receive the highest price because of the uniformity of the eggs so graded.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the spirit of the invention.

Referring to the accompanying drawings forming a part of the application:

Figure 1 is a perspective view of an egg-grading balance embodying the invention, Figure 2 is a sectional view on the line 2—2 of Figure 1, and Figure 3 is a sectional view on the line 3—3 of Figure 1.

Corresponding and like parts are referred to in the following description and designated in the several views of the drawings by like reference characters.

The device comprises a suitable base 1 upon which is mounted a U-shaped bracket 2, to the uprights of which is pivoted a scale beam 3. An upright 4 is mounted upon one end of the base 1 and its upper end is bent laterally to form a stop 5 which overhangs the scale beam 3 to limit the upward movement thereof. A stop 6 projects laterally from the upright 4 and serves to limit the downward movement of the scale beam, said stop being of L-form to present lateral displacement of the scale beam and maintain the same between the stops 5 and 6 which limit the movement of the scale beam.

In the preferable construction, the scale beam consists of a metal strap doubled upon itself and having the fold or bight expanded into substantially circular form, as indicated at 7, and having the portions adjacent the fold or bight outwardly deflected, as indicated at 8, and receiving the pivot pin 9 which connects the scale beam to the uprights of the bracket 2. The outer end portions of the strap are brought together and are suitably calibrated to designate a given number of ounces to the dozen. A suitable bob weight 10 is adjustable on the scale beam to indicate the weight of the egg to be determined.

A cup 12 is provided to receive the egg 13 and this cup is pivoted at its upper end to the circular end portion 7 of the scale beam at 14 and to maintain the cup 12 in upright position, it is provided at its lower end with a weight 15 which may be attached thereto in any manner. The egg 13 is placed in the cup 12 in upright position and is prevented from tilting by means of the weight 15 which operates to normally hold the cup 12 in vertical position.

What is claimed is:

1. A scale comprising a suitable support, a scale beam pivoted intermediate its ends on said support and having a circular enlargement at one end adapted to receive the material to be weighed, said scale beam consisting of a metal strap folded upon itself and having the fold or bight expanded into circular form, and a weighted article receiving cup pivotally disposed in said enlargement.

2. A scale having a beam consisting of a strap doubled upon itself to provide a circular enlargement at one end, an article receiving cup pivotally disposed in said enlargement, and a weight on said cup to hold it normally in a vertical position.

In testimony whereof I affix my signature in presence of two witnesses.

GUSTAV A. CARLSTEDT.

Witnesses:
ANTHONY B. BENTLY,
GEO. A. PROFITT.